United States Patent
Blea et al.

(10) Patent No.: US 8,549,242 B2
(45) Date of Patent: Oct. 1, 2013

(54) VOLUME SWAPPING OF POINT-IN-TIME READ-ONLY TARGET VOLUMES

(75) Inventors: David R. Blea, Tucson, AZ (US); Gregory E. McBride, Vail, AZ (US); William J. Rooney, Hopewell Junction, NY (US)

(73) Assignee: International Business Machines Corporation, Armonk, NY (US)

( * ) Notice: Subject to any disclaimer, the term of this patent is extended or adjusted under 35 U.S.C. 154(b) by 751 days.

(21) Appl. No.: 12/764,582

(22) Filed: Apr. 21, 2010

(65) Prior Publication Data

US 2011/0264878 A1    Oct. 27, 2011

(51) Int. Cl.
 *G06F 12/00* (2006.01)

(52) U.S. Cl.
 USPC .................... 711/162; 711/114; 711/E12.103

(58) Field of Classification Search
 USPC .................... 711/114, 162, 112, 165, E12.103
 See application file for complete search history.

(56) References Cited

U.S. PATENT DOCUMENTS

| | | | |
|---|---|---|---|
| 5,968,182 A | 10/1999 | Chen et al. | |
| 7,133,989 B2 | 11/2006 | Burton et al. | |
| 7,139,851 B2 | 11/2006 | Fujibayashi | |
| 7,376,859 B2 | 5/2008 | Boyd et al. | |
| 7,398,420 B2 | 7/2008 | Sutoh | |
| 7,523,277 B1 | 4/2009 | Kekre et al. | |
| 7,600,146 B2 * | 10/2009 | Liccione et al. | 714/3 |
| 2004/0181639 A1 * | 9/2004 | Jarvis et al. | 711/161 |
| 2004/0186968 A1 * | 9/2004 | Factor et al. | 711/162 |
| 2004/0243778 A1 * | 12/2004 | Barrios et al. | 711/165 |
| 2005/0171979 A1 | 8/2005 | Stager et al. | |
| 2006/0020753 A1 | 1/2006 | Cochran et al. | |
| 2007/0162513 A1 | 7/2007 | Lewin et al. | |
| 2007/0220223 A1 * | 9/2007 | Boyd et al. | 711/162 |
| 2007/0220312 A1 | 9/2007 | Boyd et al. | |
| 2008/0086608 A1 | 4/2008 | Kano | |
| 2008/0222377 A1 * | 9/2008 | Wightwick et al. | 711/162 |
| 2008/0313414 A1 | 12/2008 | Shackelford | |
| 2009/0144345 A1 | 6/2009 | Werner et al. | |
| 2010/0287348 A1 * | 11/2010 | Sampathkumar | 711/162 |

\* cited by examiner

*Primary Examiner* — Pierre-Michel Bataille
(74) *Attorney, Agent, or Firm* — Francis Lammes; Stephen J. Walder, Jr.; Feb R. Cabrasawan

(57) ABSTRACT

A mechanism is provided for adding point-in-time copy relationships to a data processing system. A request is received to establish a first point-in-time copy relationship. Responsive to determining that a first target of the first point-in-time copy relationship is target write inhibited, that a source of the first point-in-time copy relationship is a source of a first continuous synchronous copy relationship, that a target of the first continuous synchronous copy relationship is part of a second point-in-time copy relationship, and that the source of the first point-in-time copy relationship is part of a volume swap configuration, a volume swap relationship is added between the first point-in-time target volume and the second point-in-time target volume to the volume swap configuration. Both point-in-time copy relationships are established and any continuous synchronous copy requirements of the volume swap relationship between the first point-in-time target volume and the second point-in-time target volume are disabled.

20 Claims, 6 Drawing Sheets

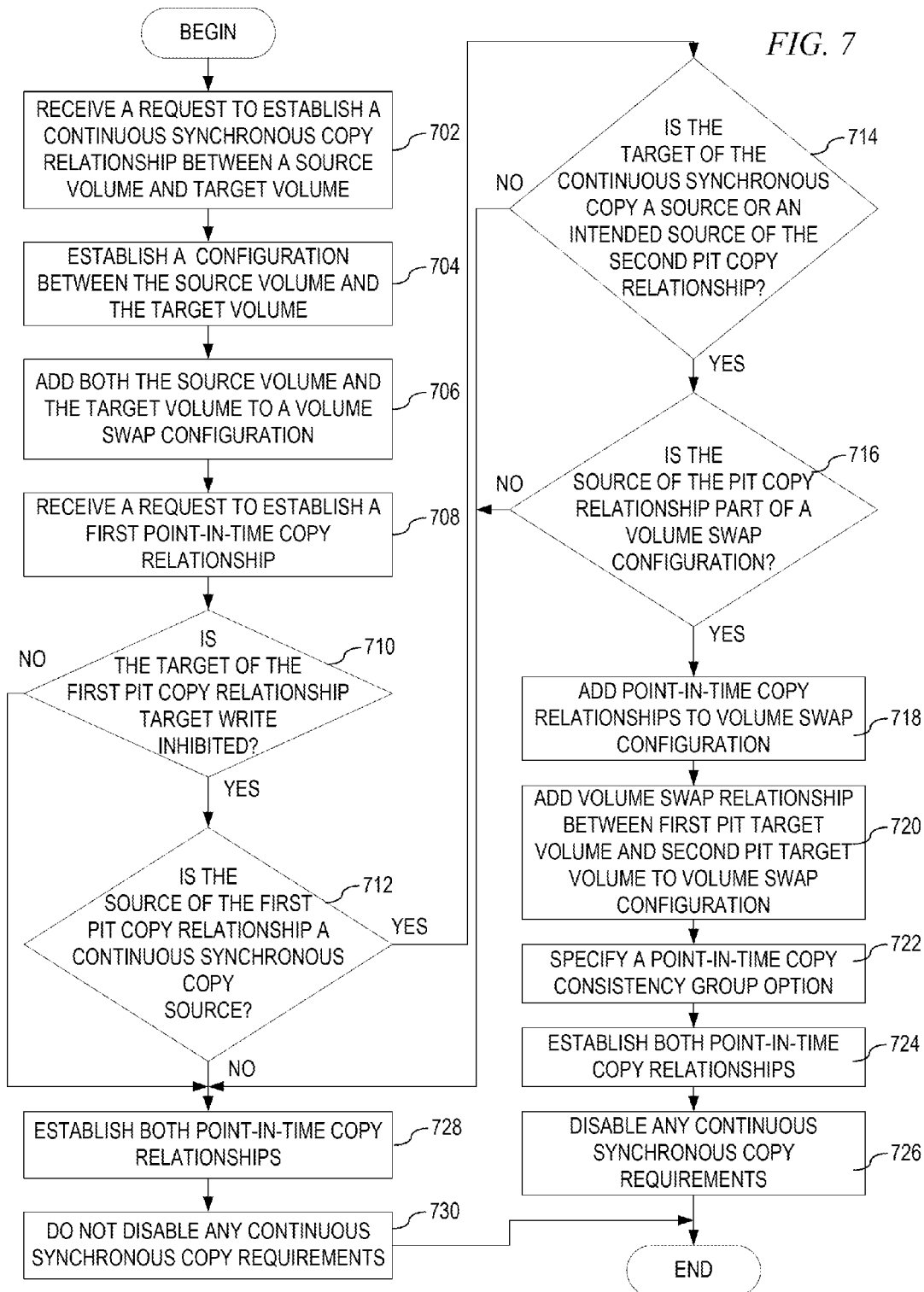

VOLUME SWAPPING OF POINT-IN-TIME READ-ONLY TARGET VOLUMES

BACKGROUND

The present application relates generally to an improved data processing apparatus and method and more specifically to mechanisms for volume swapping point-in-time read-only target volumes.

In known data processing systems, instantaneous point-in-time copy relationships may be established between a source volume and a target volume. At the time the instantaneous point-in-time relationship is established, the data processing system may atomically establish a second instantaneous point-in-time relationship between a continuous synchronous copy volume associated with the source volume and another target volume as well as establishing another continuous synchronous copy relationship between the target volumes. However, establishing both continuous synchronous copy relationships between the source volume and the continuous synchronous copy volume as well as between the target volumes requires significant set-up time, additional resources on and between the storage system, additional planning and monitoring by the operator (or application), additional bandwidth for the continuous synchronous copy paths, or the like. Further, additional storage system resources include the additional connections (paths) to copy the data and the additional bandwidth over the connections to complete a full copy of the target volumes. If the paths to copy the data are not direct connections, additional switching resources may also be required. As the instantaneous point-in-time copies may only be initiated when the continuous copy relationships are in a full duplex state, additional work is required to monitor the continuous copy relationships prior to initiating the instantaneous point-in-time copies.

SUMMARY

In one illustrative embodiment, a method, in a data processing system, is provided for adding point-in-time copy relationships to the data processing system. The illustrative embodiment receives a request to establish a first point-in-time copy relationship. The illustrative embodiment adds a volume swap relationship between the first point-in-time target volume and the second point-in-time target volume to the volume swap configuration in response to determining that a first target of the first point-in-time copy relationship is target write inhibited, determining that a source of the first point-in-time copy relationship is a source of a first continuous synchronous copy relationship, determining that a target of the first continuous synchronous copy relationship is either a source of an already established second point-in-time copy relationship or an intended source of the second point-in-time copy relationship, and determining that the source of the first point-in-time copy relationship is part of a volume swap configuration. The illustrative embodiment establishes both point-in-time copy relationships in the data processing system. The illustrative embodiment disables any continuous synchronous copy requirements of the volume swap relationship between the first point-in-time target volume and the second point-in-time target volume.

In other illustrative embodiments, a computer program product comprising a computer useable or readable medium having a computer readable program is provided. The computer readable program, when executed on a computing device, causes the computing device to perform various ones, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones, and combinations of the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein:

FIG. 7 depicts a flowchart outlining example operations performed by a copy services manager in adding point-in-time copy relationships to a data processing system in accordance with an illustrative embodiment.

DETAILED DESCRIPTION

The illustrative embodiments provide a mechanism for changing current implementations for volume swapping from a source volume to a target volume, such as the service provided by HyperSwap®, to have a copy services manager recognize that the source volume and target volume of a synchronous continuous copy relationship are both sources of respective pending point-in-time copy relationships, such as the service provided through FlashCopy®. With this knowledge, the copy services manager will add the point-in-time copy target volumes into the volume swapping configuration and pass the new configuration to either a Input/Output Supervisor (IOS) in a z/OS® system, a device driver in a AIX® system, or the like, when establishing the point-in-time copy relationships. Using the new configuration may make a point-in-time copy target eligible for a volume swapping operation. When the point-in-time copy relationships are withdrawn, the copy services manager will load a new configuration that has the point-in-time copy target volume removed making the volumes no longer volume swapping capable.

HyperSwap® for z/OS® systems and HyperSwap® for ALX® systems (also known as Open HyperSwap®) provide a storage system high availability function that will switch input/output (I/O) requests from a source volume of a synchronous continuous copy to a target volume of the synchronous continuous copy without having to restart applications using the source volume. HyperSwap® may be initiated by command or as a result of a permanent input/output (I/O) failure when reading from or writing to the source volume. The set of continuous copy volumes and their role in the copy is passed to a Input/Output Supervisor (IOS) (z/OS®) or a device driver (AIX®). This configuration is then saved for later use by the IOS or the device driver to execute the HyperSwap®.

FlashCopy® is a point-in-time copy that will save a copy of data on a target volume as it exists on a source volume at the time the flash copy relationship was established and the copy initiated. The source and target volume may be independently updated at any time after the establishment. Many FlashCopy® relationships are created where the target volume is not updated or should never be updated. For these cases, the FlashCopy® relationship is established with a 'target write inhibited' option. These copies may be used for making backups or for batch processing checkpoints.

Figure 1:
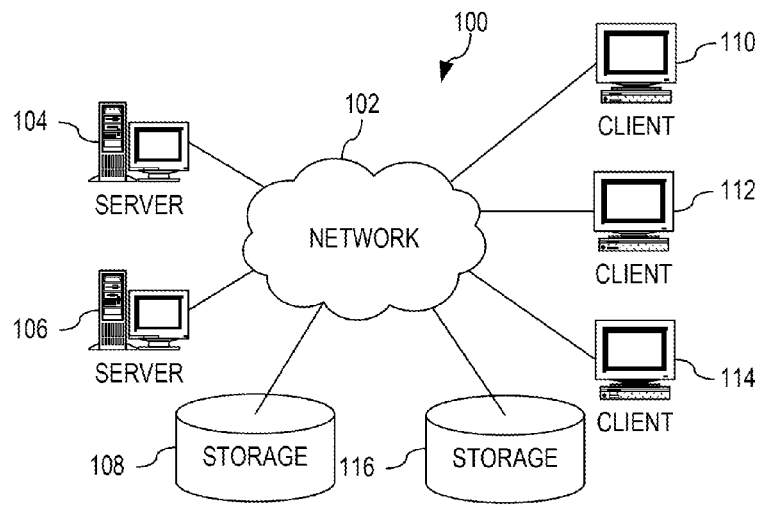
FIG. 1 depicts a pictorial representation of an example distributed data processing system in which aspects of the illustrative embodiments may be implemented.
Figure 2:
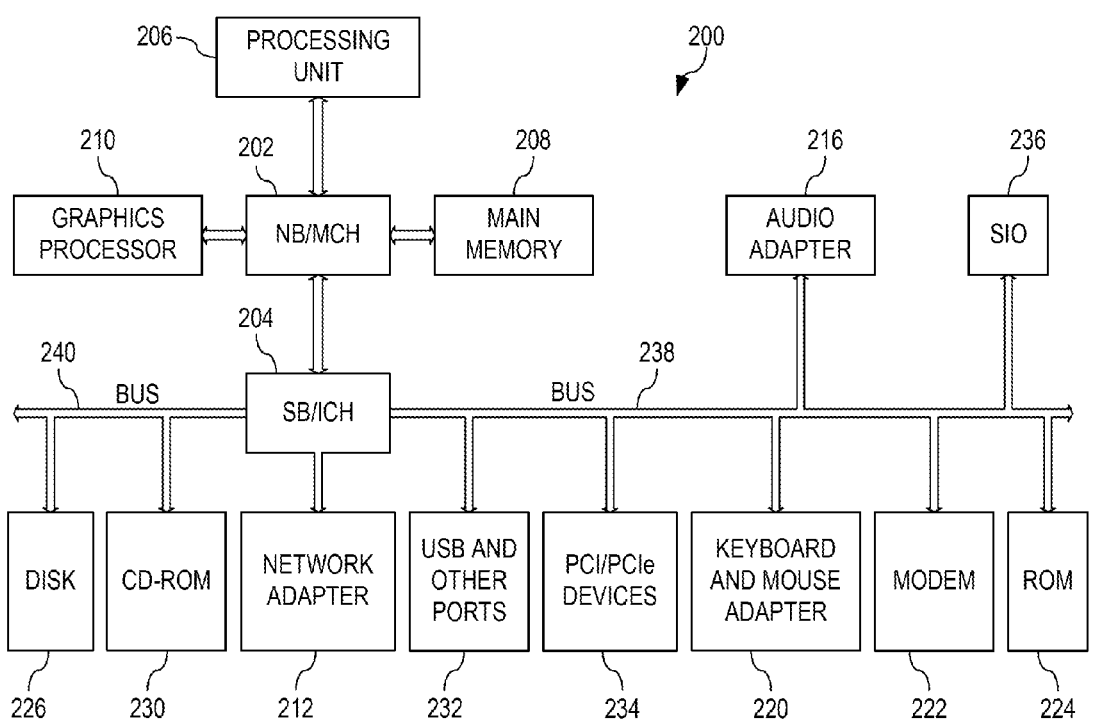
FIG. 2 shows a block diagram of an example data processing system in which aspects of the illustrative embodiments may be implemented.

Thus, the illustrative embodiments may be utilized in many different types of data processing environments including a distributed data processing environment, a single data processing device, or the like. In order to provide a context for the description of the specific elements and functionality of the illustrative embodiments, FIGS. 1 and 2 are provided hereafter as example environments in which aspects of the illustrative embodiments may be implemented. While the description following FIGS. 1 and 2 will focus primarily on a single data processing device implementation of a mechanism that volume swaps point-in-time read-only target volumes, this is only an example and is not intended to state or imply any limitation with regard to the features of the present invention. To the contrary, the illustrative embodiments are intended to include distributed data processing environments and embodiments in which point-in-time read-only target volumes are volume swapped.

With reference now to the figures and in particular with reference to FIGS. 1-2, example diagrams of data processing environments are provided in which illustrative embodiments of the present invention may be implemented. It should be appreciated that FIGS. 1-2 are only examples and are not intended to assert or imply any limitation with regard to the environments in which aspects or embodiments of the present invention may be implemented. Many modifications to the depicted environments may be made without departing from the spirit and scope of the present invention.

With reference now to the figures. FIG. 1 depicts a pictorial representation of an example distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage units 108 and 116. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

With reference now to FIG. 2, a block diagram of an example data processing system is shown in which aspects of the illustrative embodiments may be implemented. Data processing system 200 is an example of a computer, such as client 110 or server 104 in FIG. 1, in which computer usable code or instructions implementing the processes for illustrative embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows® XP (Microsoft and Windows are trademarks of Microsoft Corporation in the United States, other countries, or both). An object-oriented programming system, such as the Java™ programming system, may run in conjunction with the operating system and provides calls to the operating system from Java™ programs or applications executing on data processing system 200 (Java is a trademark of Sun Microsystems. Inc. in the United States, other countries, or both).

As a server, data processing system 200 may be, for example, an IBM® Power Systems, running the Advanced Interactive Executive (AIX®) operating system or the LINUX® operating system (Power Systems and AIX are trademarks of International Business Machines Corporation in the United States, other countries, or both while LINUX is a trademark of Linus Torvalds in the United States, other countries, or both). Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1-2 may vary depending on the implementation. Other internal hardware or peripheral, devices, such as flash memory, equivalent non-volatile memory, optical disk drives, or the like, may be used in addition to or in place of the hardware depicted in FIGS. 1-2. Also, the processes of the illustrative embodiments may be applied to a multiprocessor data processing system without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device which is configured with flash memory to provide non-volatile memory for storing operating system files and/or user-generated data, for example. Essentially, data processing system 200 may be any known or later developed data processing system without architectural limitation.

Figure 3A:
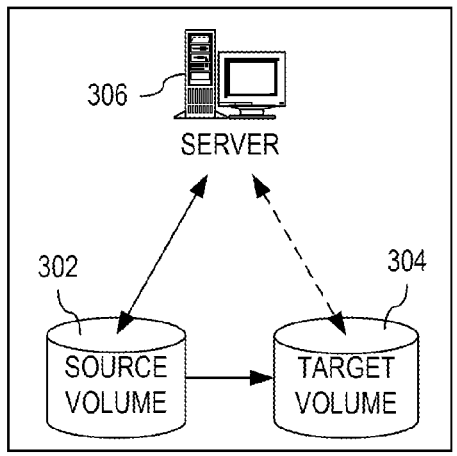
FIGS. 3A and 3B depict an example of a continuous synchronous copy relationship between two storage volumes in accordance with an illustrative embodiment.
Figure 3B:
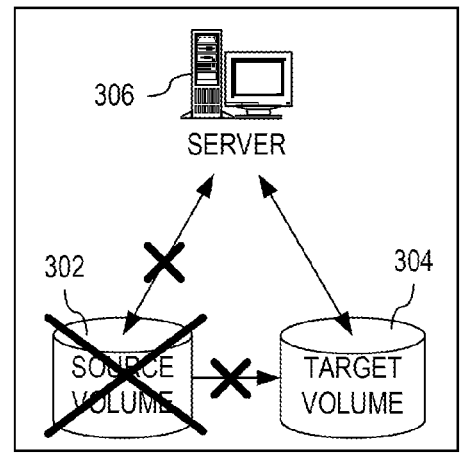

FIGS. 3A and 3B depict an example of a continuous synchronous copy relationship between two storage volumes in accordance with an illustrative embodiment. As shown in the FIG. 3A, source volume 302 and target volume 304, which are part of the continuous synchronous copy relationship, are in a full duplex state. A full duplex state occurs when two volumes, source volume 302 and target volume 304, are in a continuous synchronous copy relationship and both volumes have identical data. Both source volume 302 and target volume 304 are either attached, mounted, or the like, to server 306. When an application on server 306 writes to source volume 302, that same data is written to target volume 304 before control is returned to the application. Thus, the data on target volume 304 is the same as the data on source volume 302.

In FIG. 3B, when an Input/Output Supervisor (IOS), device driver, or the like, in server 306 receives a command or detects an error in writing to or reading from source volume 302, the IOS, device driver, or the like, initiates a volume swap. The IOS, device driver, or the like then directs a storage controller associated with source volume 302 to terminate the continuous synchronous copy between source volume 302 and target volume 304 and the IOS, device driver, or the like, in server 306 directs all subsequent I/O to target volume 304.

Figure 4A:
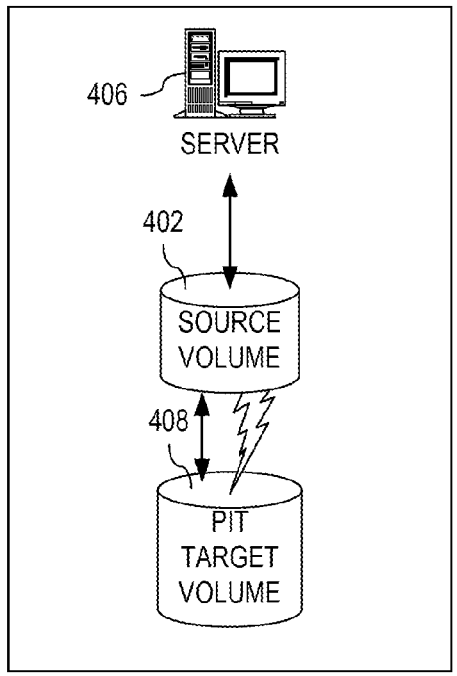
FIGS. 4A and 4B depict an example of a point-in-time copy relationship between two storage volumes in accordance with an illustrative embodiment.
Figure 4B:
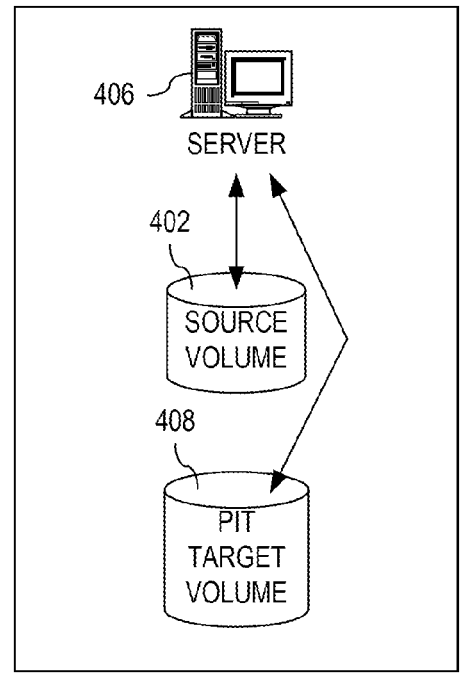

FIGS. 4A and 4B depict an example of a point-in-time copy relationship between two storage volumes in accordance with an illustrative embodiment. As is shown in FIG. 4A, a point-in-time copy relationship is established between source volume 402 and point-in-time (PIT) target volume 408. When server 406 initiates a point-in-time copy, data on source volume 402 is copied to point-in-time target volume 408 as the data existed at the time the point-in-time copy was initiated. When server 406 initiates a new point-in-time copy, previous data on point-in-time target volume 408 is erased and the data as it exists at the time the new point-in-time copy is initiated is copied to point-in-time target volume 408.

In FIG. 4B, server 406 may use data on point-in-time target volume 408 as a source for a backup operation, data mining, or the like. Using a point-in-time copy operation in this way allows the application to be quiesced only for the time necessary to perform the point-in-time copy operation, which is a fraction of the time necessary to write all of the data of source volume 402 to another backup device, such as a backup tape, external drive, or the like.

Figure 5C:
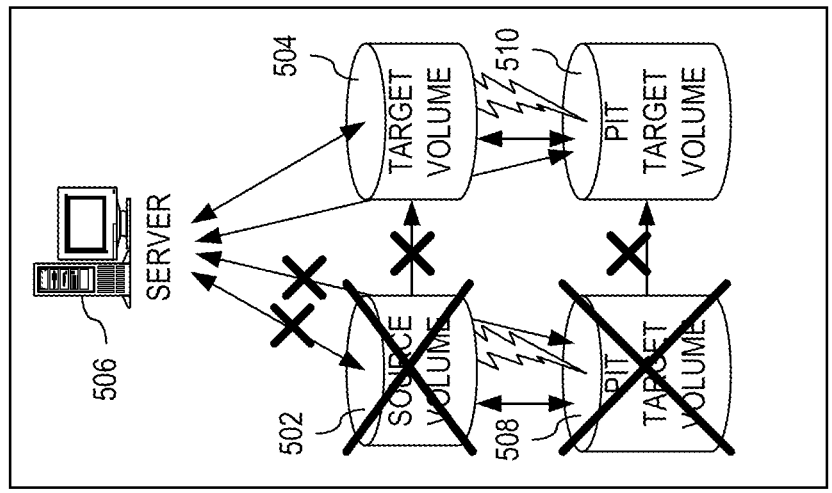
FIGS. 5A-5C depict an example of an existing volume swapping environment that uses both continuous synchronous copy and point in time copy relationships in accordance with an illustrative embodiment.
Figure 5B:
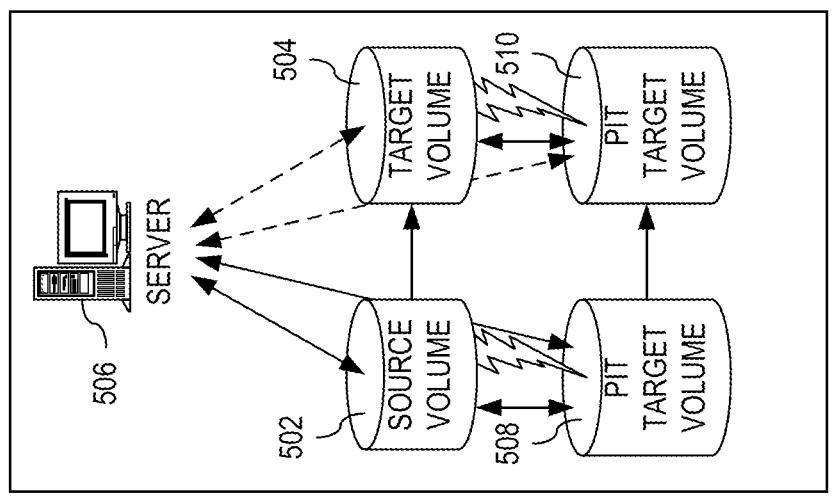
Figure 5A:
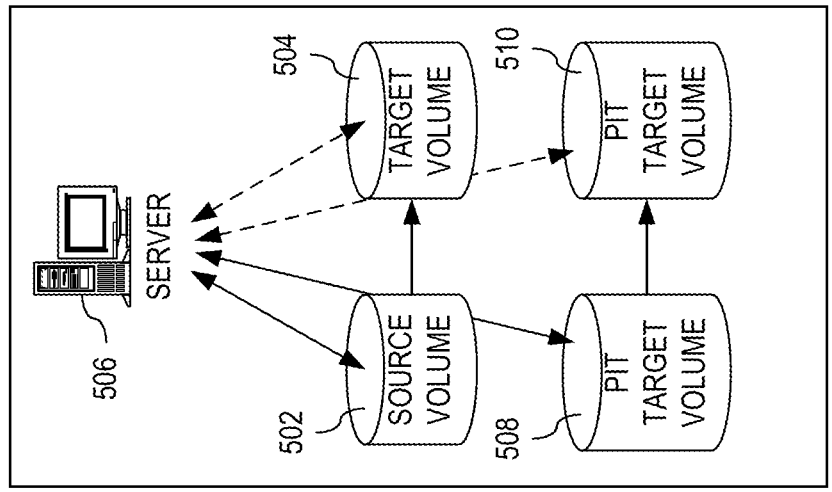

FIGS. 5A-5C depict an example of an existing volume swapping environment that uses both continuous synchronous copy and point in time copy relationships in accordance with an illustrative embodiment. FIGS. 5A-5C depict one example of a volume swapping configuration whether it be for readable, writable, or readable/writable point-in-time copy relationship, although all known volume swapping configurations that use a readable, writable, or readable/writable point-in-time copy relationship required a continuous synchronous copy relationship between the point-in-time target volumes. Thus, in the depicted volume swapping environment, the use of point-in-time copy relationships require that source volume 502 and target volume 504 be in a continuous synchronous copy relationship and in a full duplex state as well as point-in-time target volumes 508 and 510 be in a continuous synchronous copy relationship and in a full duplex state prior to establishment of the point-in-time copy relationship between source volume 502 and point-in-time target volume 508 and between target volume 504 and point-in-time target volume 510.

As shown in FIG. 5A, two continuous synchronous copy relationships are established between source volume 502 and target volume 504 and between point-in-time target volume 508 and point-in-time target volume 510. Once the continuous synchronous copy relationships are established, server 506 and/or a storage controller (not shown) may initiate a full background copy of source volume 502 to target volume 504 and of point-in-time target volume 508 to point-in-time target volume 510 so that target volume 504 and point-in-time target 510 reach a full duplex state with source volume 502 and point-in-time target volume 508, respectively.

In FIG. 5B, once target volume 504 reaches a full duplex state with source volume 502 and point-in-time target volume 510 reaches a full duplex state with point-in-time target volume 508, point-in-time copy relationships may be established between source volume 502 and point-in-time target volume 508. At the time the point-in-time relationships are established, the server identifies whether point-in-time target volume 508 and point-in-time target volume 510 will be readable, writable, or readable/writable. With the establishment of the point-in-time relationship between source volume 502 and point-in-time target volume 508 will atomically establish a point-in-time relationship between target volume 504 and point-in-time target volume 510. Any updates made to point-in-time target volume 508 are also mirrored to point-in-time target volume 510 because of the continuous synchronous copy relationship between point-in-time target volume 508 and point-in-time target volume 510. Server 506 stores the established relationships as a volume swapping configuration. The volume swapping configuration includes all of the volumes and their respective roles as all of the volume are in one or more continuous copy relationships and/or point-in-time copy relationships.

In FIG. 5C, when an Input/Output Supervisor (IOS), device driver, or the like, in server 506 receives a command or detects an error in writing to or reading from source volume 502 or point-in-time target volume 508, the IOS, device driver, or the like, initiates a volume swap. A storage controller associated with source volume 502, on its own or in response to an explicit command from server 506, terminates the continuous synchronous copy between source volume 502 and target volume 504 as well as the continuous synchronous copy between point-in-time target volume 508 and point-in-time target volume 510. The IOS, device driver, or the like, in server 506 directs all subsequent I/O to target volume 504 and point-in-time target volume 510.

As is illustrated in FIG. 5B, the illustrated volume swapping method requires and establishes both a continuous synchronous copy of point-in-time target volume 508 to point-in-time target volume 510 as well as point-in-time copy of target volume 504 to point-in-time target volume 510. The requirements of the continuous synchronous copy relationship between point-in-time target volume 508 and point-in-time target volume 510 requires significant set-up time and the establishment of the continuous synchronous copy relationship. The establishment of the continuous synchronous copy relationship requires additional resources on and between the storage system, additional planning and monitoring by the operator (or application), additional bandwidth for the continuous synchronous copy paths, or the like. Further, additional storage system resources include the additional connections (paths) to copy the data and the additional bandwidth over the connections to complete a full copy of point-in-time target volumes 508 and 510. If the paths to copy the data are not direct connections, additional switching resources may also be required. As the point-in-time copy may only be initiated when the continuous copy relationship is in a full duplex state, additional work is required to monitor the continuous copy relationships prior to initiating the point-in-time copy.

However, the continuous synchronous copy relationship as described in FIGS. 5A and 5B may not be necessary if the source volume 502 and point-in-time target volume 508 point-in-time copy are coordinated with the target volume 504 and point-in-time target volume 510 point-in-time copy and with both point-in-time copies are established with an inhibited target write on point-in-time target volume 508 and point-in-time target volume 510.

Figure 6A:
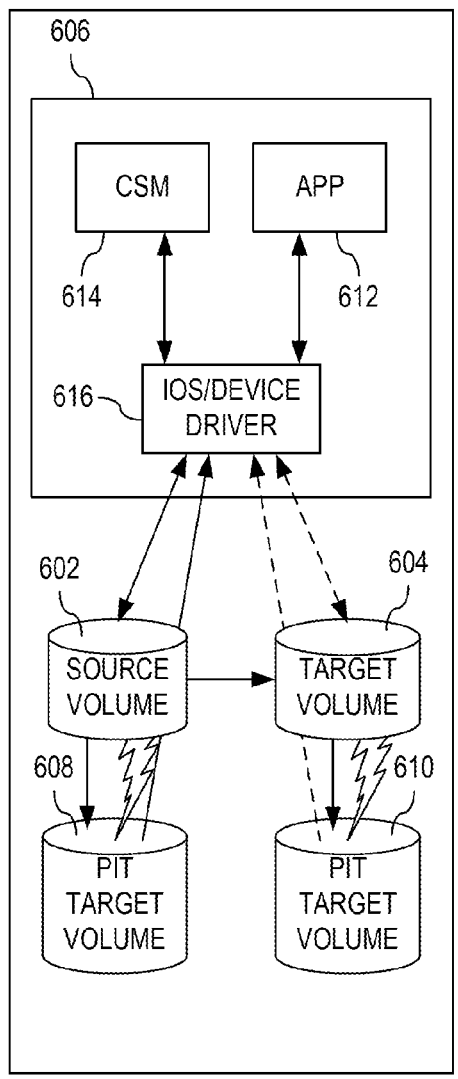
FIGS. 6A and 6B depict an example of volume swapping environment that utilizes a copy services manager to recognize that the source volume and target volume of a continuous synchronous copy relationship are both sources of respective pending point-in-time copy relationships that will be target write inhibited in accordance with an illustrative embodiment.
Figure 6B:
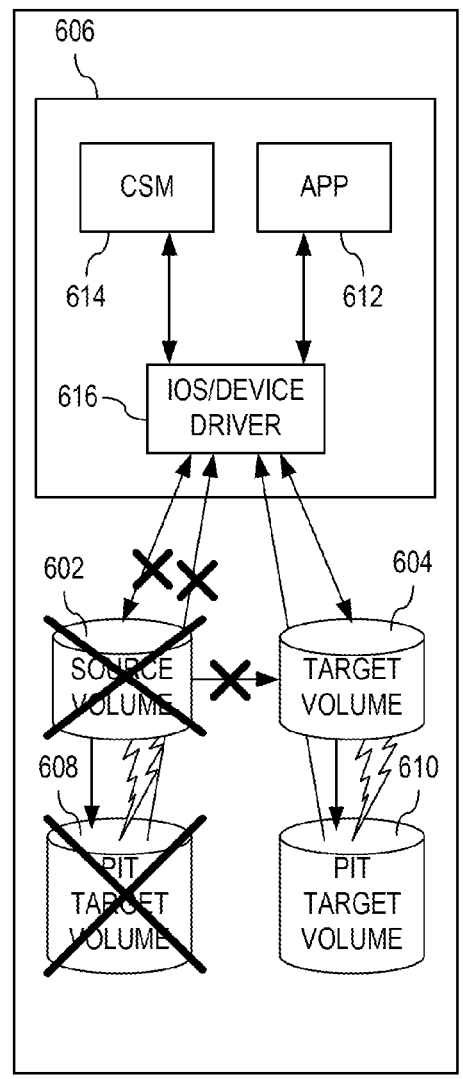

FIGS. 6A and 6B depict an example of volume swapping environment that utilizes a copy services manager to recognize that the source volume and target volume of a continuous synchronous copy relationship are both sources of respective pending point-in-time copy relationships that will be target write inhibited in accordance with an illustrative embodiment. In FIG. 6A, source volume 602 and target volume 604 are established as part of a continuous synchronous copy relationship and are set up in a full duplex state. That is, when application 612 on server 606 writes to source volume 602, that same data is written to target volume 604 before control is returned to application 612. Thus, the data on target volume 604 is the same as the data on source volume 602, which is considered a full duplex state. Both source volume 602 and target volume 604 are coupled to server 606 either by attachment, mounting, or the like.

Once coupled to server 606, copy services manager (CSM) 614 adds both source volume 602 and target volume 604 as a volume swap relationship to a volume swap configuration that identifies the pair of volumes as a continuous synchronous copy pair and that target volume 604 is the volume to be swapped to if a command is received to perform a volume swap operation or an error is detected writing to or reading from source volume 602 such that a volume swap is performed.

If in addition to the establishment of the continuous synchronous copy relationship between source volume 602 and target volume 604, there is also request to establish one or a pair of point-in-time copy relationships, copy services manager 614 determines whether point-in-time target volume 608 associated with source volume 602 is a candidate for a non-continuous synchronous copy volume swap relationship. Copy services manager 614 first determines whether the targets of the point-in-time copy relationships, point-in-time target volumes 608 and 610, are target write inhibited. If point-in-time target volumes 608 and 610 of the point-in-time copy relationships are target write inhibited, then copy services manager 614 determines whether the source of the first point-in-time copy relationship, source volume 602, is a continuous synchronous copy source. Since source volume 602 of the point-in-time copy relationship is a continuous synchronous copy source, then copy services manager 614 determines whether the target of the aforementioned continuous synchronous copy, target volume 604, is either the source of the already established second point-in-time copy relationship or is intended to be a source of the second point-in-time copy relationship. Since target volume 604 of the aforementioned continuous synchronous copy is the source or intended source of the second point-in-time copy relationship with point-in-time target volume 610, then copy services manager 614 determines whether the source of the first point-in-time copy relationship, source volume 602, which is also a continuous synchronous copy source to target volume 604, is part of the volume swap configuration. That is, copy services manager 614 determines if a volume swap relationship between source volume 602 and target volume 604, which matches the continuous synchronous copy relationship between source volume 602 and target volume 604, exists in the volume swap configuration.

Since source volume 602 is the source of the first point-in-time copy relationship and is part of the volume swap configuration, then copy services manager 614 adds the point-in-time copy relationship between source volume 602 and point-in-time target volume 608 as well as the point-in-time copy relationship between target volume 604 and point-in-time target volume 610 to the volume swap configuration. Adding the point-in-time copy relationships to the volume swap configuration by copy services manager 614 is purely for providing additional information to IOS/device driver 616, as the point-in-time relationships are not used during a volume swap. By adding the point-in-time relationships to the volume swap configuration, copy services manager 614 makes IOS/device driver 616 aware of the existence of the point-in-time copy relationships and is therefore purely optional.

Copy services manager 614 then adds a volume swap relationship between point-in-time target volume 608 and point-in-time target volume 610 to the volume swap configuration with a flag set indicating that the IOS, device driver, or the like, need not verify or monitor any continuous synchronous copy requirements between point-in-time target volumes 608 and 610. After the volume swap relationships have been added to the volume swap configuration and prior to establishing both point-in-time copy relationships, it is critical that point-in-time target volume 608 and point-in-time target volume 610 have the same data. In order to ensure that both volumes have the same data, when copy services manager 614 establishes the point-in-time relationships, copy services manager 614 specifies a point-in-time copy consistency group option. The point-in-time consistency group option causes source volume 602 to be long busied while copy services manager 614 initiates a point-in-time copy between source volume 602 and point-in-time target volume 608 as well as a point-in-time copy between target volume 604 and point-in-time target volume 610. Even if copy services manager 614 initiates the paint-in-time copy between target volume 604 and point-in-time target volume 610 first, the long busy is propagated back to the source volume 602 because of the continuous synchronous copy relationship between source volume 602 and target volume 604.

Long busy is a condition where a storage controller temporarily prevents new I/O to the storage controller by presenting a "busy" or "uninterruptable" condition. However, a long busy also indicates that the "busy" will be longer than normal. When IOS/device driver 616 identifies a long busy, IOS/device driver 616 recognizes to hold I/O until the storage controller clears the uninterruptable condition. By doing this, the storage controller and/or CSM 614 has time to perform other actions that must be completed before the particular device is accessed again. In this example, a long busy provides CSM 614 with time to initiate the point-in-time copy between source volume 602 and point-in-time target volume 608, and between target volume 604 and point-in-time target volume 610, knowing that source volume 602 and target volume 604 are identical copies of each other when their respective point-in-time copies were initiated. While the illustrative embodiments use a long busy to prevent new I/O to the storage controller, the illustrative embodiments also recognize that other conditions may also be used to prevent new I/O from going to the storage controller, such as pausing, stopping, shutting down an application, or the like.

In addition to establishing the point-in-time relationships and adjusting the volume swap configuration, copy services manager 614 disables any continuous synchronous copy requirements between point-in-time target volume 608 and point-in-time target volume 610. If any of the conditions determined by copy services manager 614 are negative, then copy services manager 614 establishes both point-in-time copy relationships but does not disable any continuous synchronous copy requirements between point-in-time target volume 608 and point-in-time target volume 610. Once the volume swap configuration is adjusted, copy service manager 614 may load or pass the volume swap configuration to IOS/device driver 616 for implementation.

If copy services manager 614 receives a request to withdraw one or more point-in-time copy relationships, copy services manager 614 determines whether the one or more point-in-time copy target volumes, point-in-time target volume 608 or 610, are part of the volume swap configuration. If either point-in-time target volume 608 or 610 are part of the volume swap configuration, then copy services manager 614 removes the point-in-time copy relationship between source volume 602 and point-in-time target volume 608 as well as the point-in-time copy relationship between target volume 604 and point-in-time target volume 610 from the volume swap configuration as well as the volume swap relationship between point-in-time target volume 608 and point-in-time target volume 610 from the volume swap configuration.

In FIG. 6B, when IOS/device driver 616 in server 606 receives a command or detects an error in writing to or reading from either source volume 602 or point-in-time target volume 608, IOS/device driver 616 initiates a volume swap. IOS/device driver 616 then terminates the continuous synchronous copy between source volume 602 and target volume 604. IOS/device driver 616 then directs all subsequent I/O to target volume 604 and point-in-time target volume 610. In addition, all the requirements of a continuous synchronous copy relationship between point-in-time target volume 608 and point-in-time target volume 610, such as significant set-up time, establishment of the continuous synchronous copy relationship, additional resources on and between the storage system, additional planning and monitoring by the operator (or application), and additional bandwidth for the continuous synchronous copy paths, are no longer required and a cost savings may be realized.

The copyset formed by source volume 602, target volume 604, point-in-time target volume 608 and point-in-time target volume 610 may be just one of what may be any number of copysets in a data processing system and may be all part of a singular session. When IOS/device driver 616 receives a command or detects an error in writing to or reading from either source volume 602 or point-in-time target volume 608, IOS/device driver 616 may also terminate other copy relationships in the session based on the established copysets.

Thus, the illustrative embodiments provide a mechanism for changing current implementations for volume swapping from a source volume to a target volume through a copy services manager recognizing that the source volume and target volume of a synchronous continuous copy relationship are both sources of respective pending point-in-time copy relationships that are write-inhibited. With this knowledge, the copy services manager will add the point-in-time copy target volumes into the volume swapping configuration and puss the new configuration to either an Input/Output Supervisor (IOS), a device driver, or the like, prior to establishing the point-in-time copy relationships. Using the new configuration may make a point-in-time copy target eligible for a volume swapping operation. When the point-in-time copy relationships are withdrawn, the copy services manager will pass a new configuration to the IOS/device driver that has the point-in-time copy target volume removed making the volumes no longer volume swapping capable.

As will be appreciated by one skilled in the art, the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in any one or more computer readable medium(s) having computer usable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, device, or any suitable combination of the foregoing. More specific examples (a non-exhaustive list) of the computer readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in a baseband or as part of a carrier wave. Such a propagated signal may take any of a variety of forms, including, but not limited to, electronic, magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Computer code embodied on a computer readable medium may be transmitted using any appropriate medium, including but not limited to wireless, wireline, optical fiber cable, radio frequency (RF), etc., or any suitable combination thereof.

Computer program code for carrying out operations for aspects of the present invention may be written in any combination of one or more programming languages, including an object oriented programming language such as Java, Smalltalk™, C++, or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

Figure 8:
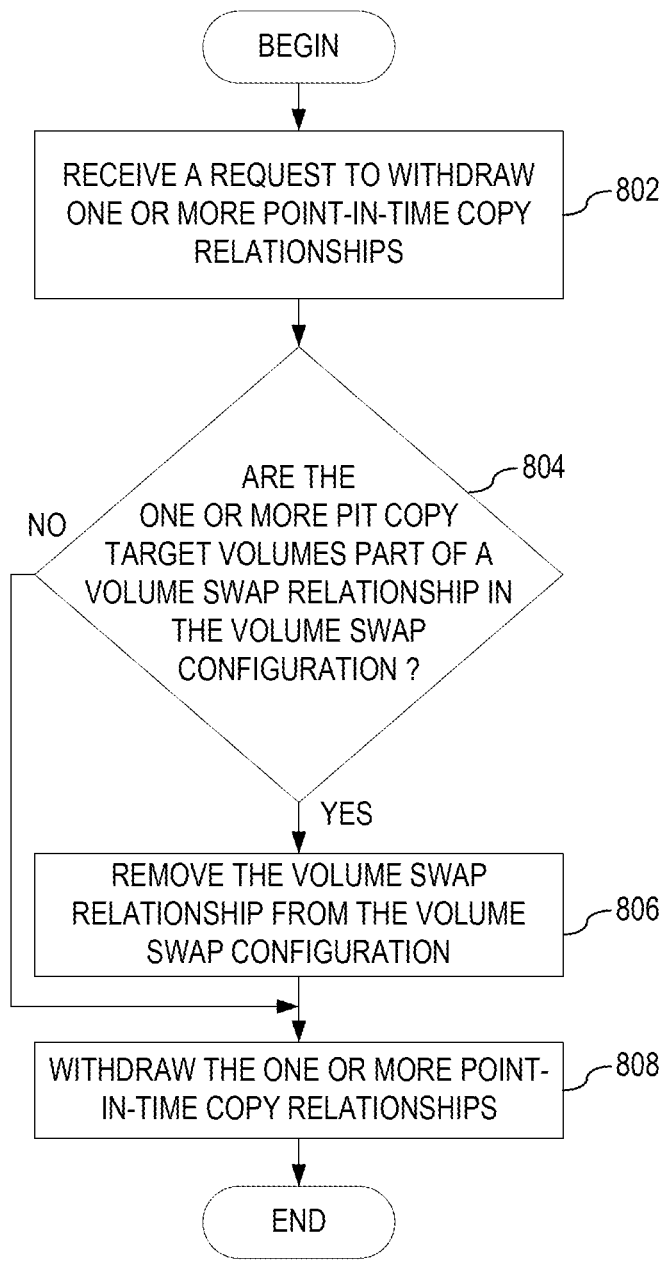
FIG. 8 depicts a flowchart outlining example operations performed by a copy services manager in withdrawing point-in-time copy relationships to a data processing system in accordance with an illustrative embodiment.

Referring now to FIGS. 7 and 8, these figures provide flowcharts outlining example operations of volume swapping point-in-time read-only target volumes. FIG. 7 depicts a flowchart outlining example operations performed by a copy services manager in adding point-in-time copy relationships to a data processing system in accordance with an illustrative embodiment. As the operation begins, the copy services manager receives a request to establish a continuous synchronous copy relationship between a source volume and a target volume that are coupled to a server (step 702). The copy services manager establishes a configuration between the source volume and the target volume such that, when an application on the server writes to the source volume, the same data is written to the target volume before control is returned to the application (step 704). Thus, the data on the target volume is the same as the data on the source volume. The copy services manager then adds both the source volume and the target volume to a volume swap configuration that identifies the pair of volumes as a continuous synchronous copy pair and that that target volume is the volume to be swapped to if a command is received to perform a volume swap operation or an error is detected writing to or reading from the source volume such that a volume swap is performed (step 706).

As the operation continues, the copy service manager receives a request to establish a first point-in-time copy relationship (step 708). The copy services manager then determines whether the first point-in-time copy target volume associated with the source volume is a candidate for a non-continuous synchronous copy volume swap relationship. In order to make this determination, the copy services manager determines whether a target of the first point-in-time copy relationship is target write inhibited (step 710). If at step 710 the target of the first point-in-time copy relationship is target write inhibited, then the copy services manager determines whether the source of the first point-in-time copy relationship is a continuous synchronous copy source (step 712). If at step 712 the source of the first point-in-time copy relationship is a continuous synchronous copy source, then the copy services manager determines whether the target of the continuous synchronous copy is either the source of the already established second point-in-time copy relationship or is intended to be a source of the second point-in-time copy relationship (step 714). If at step 714 the target of the continuous synchronous copy is the source or intended source of the second point-in-time copy relationship, then the copy services manager determines whether the source of the first point-in-time copy relationship is part of a volume swap configuration (step 716).

If at step 716 the source of the first point-in-time copy relationship is part of volume swap configuration, then the copy services manager may add the point-in-time copy relationship between the source volume and a first point-in-time target volume as well as the point-in-time copy relationship between the target volume and the second point-in-time target volume to the volume swap configuration (step 718). Adding the point-in-time copy relationships to the volume swap configuration by the copy services manager is purely for providing additional information to the IOS, device driver, or the like, as the point-in-time relationships are not used during a volume swap. By adding the point-in-time relationships to the volume swap configuration, the IOS, device driver, or the like, is made aware of the existence of the point-in-time copy relationships and is therefore a purely optional step.

The copy services manager then adds the volume swap relationship between the first point-in-time target volume and the second point-in-time target volume to the volume swap configuration with a flag set indicating that the IOS, device driver, or the like, need not verify or monitor any continuous synchronous copy relationship between the first point-in-time target volume and the second point-in-time target volume (step 720). After the volume swap relationship has been added to the volume swap configuration at step 720 and prior to establishing both point-in-time copy relationships, the copy services manager specifies a point-in-time copy consistency group option (step 722). The point-in-time consistency option causes the source volume to be long busied or uninterruptable while the copy services manager establishes both point-in-time copy relationships between source volume and the first point-in-time target volume as well as between the target volume and the second point-in-time target volume (step 724).

In addition to establishing the point-in-time relationships and adjusting the volume swap configuration, the copy services manager disables any continuous synchronous copy requirements between the first point-in-time target volume and the second point-in-time target volume (step 726), with the operation ending thereafter. If any of the conditions at step 710, 712, 714, or 716 are not met, then the copy services manager establishes both point-in-time copy relationships (step 728) and does not disable any continuous synchronous copy requirements between the first point-in-time target volume and the second point-in-time target volume (step 730), with the operation ending thereafter. Once the volume swap configuration is adjusted, the copy service manager may load or pass the volume swap configuration to an Input/Output Supervisor (IOS), a device driver, or the like for implementation.

FIG. 8 depicts a flowchart outlining example operations performed by a copy services manager in withdrawing point-in-time copy relationships to a data processing system in accordance with an illustrative embodiment. As the operation begins, the copy services manager receives a request to withdraw one or more point-in-time copy relationships (step 802). The copy services manager determines whether the one or more point-in-time copy target volumes are part of a volume swap relationship in the volume swap configuration (step 804). If at step 804 one or more of the point-in-time target volumes are part of a volume swap relationship in the volume swap configuration, then the copy services manager removes the volume swap relationship from the volume swap configuration (step 806). Then the copy services manager withdraws the one or more point-in-time copy relationships (step 808), with the operation ending thereafter. If at step 804 none of the one or more point-in-time target volumes are part of a volume swap relationship in the volume swap configuration, then the copy services manager withdraws the one or more point-in-time copy relationships (step 808), with the operation ending thereafter. Once the volume swap configuration is adjusted, the copy service manager may load or pass the volume swap configuration to an Input/Output Supervisor (IOS), a device driver, or the like for implementation.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Thus, the illustrative embodiments provide mechanisms for a mechanism for changing current implementations for volume swapping from a source volume to a target volume to have a copy services manager recognize that the source volume and target volume of a synchronous continuous copy relationship are both sources of respective pending point-in-time copy relationships. With this knowledge, the copy services manager will add the point-in-time copy target volumes into the volume swapping configuration and pass the new configuration to either an Input/Output Supervisor (IOS), a device driver, or the like, prior to invoking the point-in-time copy. Using the new configuration may make a point-in-time copy target eligible for a volume swapping operation. When the point-in-time copy relationships are withdrawn, the copy services manager will load a new configuration that has the point-in-time copy target volume removed making the volumes no longer volume swapping capable.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for adding point-in-time copy relationships to the data processing system, the method comprising:
    receiving, by a copy services manager, a request to establish a first point-in-time copy relationship;
    determining, by the copy services manager, whether a first point-in-time target volume is a candidate for a non-continuous synchronous copy volume swap relationship;
    adding, by the copy services manager, a volume swap relationship between the first point-in-time target volume and a second point-in-time target volume to a volume swap configuration in response to determining that the first point-in-time target volume is the candidate for the non-continuous synchronous copy volume swap relationship;
    establishing, by the copy services manager, the first point-in-time copy relationship for the first point-in-time target volume in the data processing system;
    establishing, by the copy services manager, a second point-in-time copy relationship for the second point-in-time target volume in the data processing system; and
    disabling, by the copy service manager, any continuous synchronous copy requirements of the volume swap relationship between the first point-in-time target volume and the second point-in-time target volume.

2. The method of claim 1, wherein the volume swap relationship comprises a flag indicating that at least one of an input/output supervisor or a device driver need not verify or monitor any continuous synchronous copy relationship between the first point-in-time target volume and the second point-in-time target volume.

3. The method of claim 1, further comprising:
    adding, by the copy services manager, the first point-in-time copy relationship between a source volume and the first point-in-time target volume and the second point-in-time copy relationship between a target volume and the second point-in-time target volume to the volume swap configuration.

4. The method of claim 1, wherein determining whether the first point-in-time target volume is the candidate for the non-continuous synchronous copy volume swap relationship comprises:
    determining, by the copy services manager, whether the first point-in-time target volume of the first point-in-time copy relationship is target write inhibited;
    determining, by the copy services manager, whether a source volume of the first point-in-time copy relationship is a source of a continuous synchronous copy relationship in response to determining that the first point-in-time target volume is target write inhibited;
    determining, by the copy services manager, whether a target volume of the continuous synchronous copy relationship is either a source of an already established second point-in-time copy relationship or an intended source of the second point-in-time copy relationship in response to determining that the source volume of the first point-in-time copy relationship is the source of the continuous synchronous copy relationship; and
    determining, by the copy services manager, that the source volume of the first point-in-time copy relationship is part of the volume swap configuration in response to determining that the target volume of the continuous synchronous copy relationship is either the source of the already established second point-in-time copy relationship or the intended source of the second point-in-time copy relationship.

5. The method of claim 1, further comprising:
    specifying, by the copy services manager, a point-in-time copy consistency group option, wherein the point-in-time consistency option causes a source volume to be uninterruptable while the copy services manager establishes the first point-in-time copy relationship between the source volume and the first point-in-time target volume and the second point-in-time copy relationship between a target volume and the second point-in-time target volume.

6. The method of claim 1, further comprising:
    receiving, by the copy services manager, a request to establish a continuous synchronous copy relationship between a source volume and a target volume;
    establishing, by the copy services manager, a configuration between the source volume and the target volume; and
    adding, by the copy service manager, the continuous synchronous copy relationship between the source volume and the target volume to the volume swap configuration.

7. The method of claim 6, wherein, by adding the continuous synchronous copy relationship between the source volume and the target volume to the volume swap configuration, the source volume and the target volume are identified as a pair of volumes in the continuous synchronous copy relationship.

8. The method of claim 6, wherein at least one of a input/output supervisor or a device driver directs input/output commands to the target volume in response to a command being received to perform a volume swap operation or in response to an error being detected writing to or reading from the source volume or reading from the first point-in-time target volume that initiates the volume swap operation.

9. The method of claim 1, wherein, when an application on the data processing system writes data to the source volume, the same data is written to the target volume before control is returned to the application.

10. The method of claim 1, further comprising:
    receiving, by the copy services manager, a request to withdraw one or more point-in-time copy relationships;
    determining, by the copy services manager, whether targets of the one or more point-in-time copy relationships are part of the volume swap configuration;

removing, by the copy services manager, the volume swap relationship between the first point-in-time target volume and the second point-in-time target volume from the volume swap configuration in response to the targets of the one or more point-in-time copy relationships being part of the volume swap configuration; and withdrawing, by the copy services manager, the first point-in-time copy relationship and the second point-in-time copy relationship.

11. An apparatus, comprising:

a processor; and a memory coupled to the processor, wherein the memory comprises instructions which, when executed by the processor, cause the processor to;

receive a request to establish a first point-in-time copy relationship;

determine whether a first point-in-time target volume is a candidate for a non-continuous synchronous copy volume swap relationship;

add a volume swap relationship between the first point-in-time target volume and a second point-in-time target volume to a volume swap configuration in response to determining that the first point-in-time target volume is the candidate for the non-continuous synchronous copy volume swap relationship;

establish the first point-in-time copy relationship for the first point-in-time target volume in the data processing system;

establish second point-in-time copy relationship for the second point-in-time target volume in the data processing system; and disable any continuous synchronous copy requirements of the volume swap relationship between the first point-in-time target volume and the second point-in-time target volume.

12. The apparatus of claim 11, wherein the volume swap relationship comprises a flag indicating that at least one of an input/output supervisor or a device driver need not verify or monitor any continuous synchronous copy relationship between the first point-in-time target volume and the second point-in-time target volume.

13. The apparatus of claim 11, wherein the ins ructions further cause the processor to:

add the first point-in-time copy relationship between a source volume and the first point-in-time target volume and the point-in-time copy relationship between a target volume and the second point-in-time target volume to the volume swap configuration.

14. The apparatus of claim 11, wherein the instructions to determine whether the first point-in-time target volume is the candidate for the non-continuous synchronous copy volume swap relationship further cause the processor to:

determine whether the first point-in-time target volume of the first point-in-time copy relationship is target write inhibited;

determine whether a source volume of the first point-in-time copy relationship is a source of a continuous synchronous copy relationship in response to determining that the first point-in-time target volume is target write inhibited;

determine whether a target volume of the continuous synchronous copy relationship is either a source of an already established second point-in-time copy relationship or an intended source of the second point-in-time copy relationship in response to determining that the source volume of the first point-in-time copy relationship is the source of the continuous synchronous copy relationship; and determine that the source volume of the first point-in-time copy relationship is part of the volume swap configuration in response to determining that the target volume of the continuous synchronous copy relationship is either the source of the already established second point-in-time copy relationship or the intended source of the second point-in-time copy relationship.

15. The apparatus of claim 11, wherein the instructions further cause the processor to:

specify a point-in-time copy consistency group option, wherein the point-in-time consistency option causes a source volume to be uninterruptable while the copy services manager establishes the first point-in-time copy relationship between the source volume and the first point-in-time target volume and the second point-in-time copy relationship between a target volume and the second point-in-time target volume.

16. A computer program product comprising a computer readable storage medium having a computer readable program stored therein, wherein the computer readable program, when executed on a computing device, causes the computing device to:

receive a request to establish a first point-in-time copy relationship;

determine whether a first point-in-time target volume is a candidate for a non continuous synchronous copy volume swap relationship;

add a volume swap relationship between the first point-in-time target volume and a second point-in-time target volume to a volume swap configuration in response to determining that the first point-in-time target volume is the candidate for the non-continuous synchronous copy volume swap relationship;

establish the first point-in-time copy relationship for the first point-in-time target volume in the data processing system;

establish second point-in-time copy relationship for the second point-in-time target volume in the data processing system; and disable any continuous synchronous copy requirements of the volume swap relationship between the first point-in-time target volume and the second point-in-time target volume.

17. The computer program product of claim 16, wherein the volume swap relationship comprises a flag indicating that at least one of an input/output supervisor or a device driver need not verify or monitor any continuous synchronous copy relationship between the first point-in-time target volume and the second point-in-time target volume.

18. The computer program product of claim 16, wherein the computer readable program further causes the computing device to:

add the first point-in-time copy relationship between a source volume and the first point-in-time target volume and the second point-in-time copy relationship between a target volume and the second point-in-time target volume to the volume swap configuration.

19. The computer program product of claim 16, wherein the computer readable program to determine whether the first point-in-time target volume is the candidate for the non-continuous synchronous copy volume swap relationship further causes the computing device to:

determine whether the first point-in-time target volume of the first point-in-time copy relationship is target write inhibited;

determine whether a source volume of the first point-in-time copy relationship is a source of a continuous synchronous copy relationship in response to determining that the first point-in-time target volume is target write inhibited;

determine whether a target volume of continuous synchronous copy relationship is either a source of an already established second point-in-time copy relationship or an intended source of the second point-in-time copy relationship in response to determining that the source volume of the first point-in-time copy relationship is the source of the continuous synchronous copy relationship; and determine that the source volume of the first point-in-time copy relationship is part of the volume swap configuration in response to determining that the target volume of the continuous synchronous copy relationship is either the source of the already established second point-in-time copy relationship or the intended source of the second point-in-time copy relationship.

20. The computer program product of claim 16, wherein the computer readable program further causes the computing device to specify a point-in-time copy consistency group option, wherein the point-in-time consistency option causes a source volume to be uninterruptable while the copy services manager establishes the first point-in-time copy relationship between the source volume and the first point-in-time target volume and the second point-in-tune copy relationship between a target volume and the second point-in-time target volume.

* * * * *